United States Patent
Sudhakar (10) Patent No.: US 8,806,214 B2
(45) Date of Patent: **\*Aug. 12, 2014**

(54) COMMUNICATION WITH NON-REPUDIATION AND BLIND SIGNATURES

(75) Inventor: Gosukonda Naga Venkata Satya Sudhakar, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/082,092

(22) Filed: Apr. 7, 2011

(65) Prior Publication Data

US 2011/0185170 A1    Jul. 28, 2011

Related U.S. Application Data

(63) Continuation-in-part of application No. 12/325,425, filed on Dec. 1, 2008.

(51) Int. Cl.
| | |
|---|---|
| H04L 9/32 | (2006.01) |
| H04N 21/8358 | (2011.01) |
| G11B 20/00 | (2006.01) |
| G06F 15/16 | (2006.01) |
| H04K 1/00 | (2006.01) |
| H04L 9/00 | (2006.01) |

(52) U.S. Cl.
CPC .......... *H04L 9/3281* (2013.01); *H04N 21/8358* (2013.01); *H04N 2201/3233* (2013.01); *G11B 20/00086* (2013.01)
USPC .............. 713/176; 713/180; 709/203; 380/30

(58) Field of Classification Search
CPC ............ H04L 9/3281; H04N 21/8358; H04N 1/32144; H04N 2201/3233; G11B 20/00086
USPC ................. 713/155–159, 168–176, 150–154, 713/160–167, 189–193; 709/229; 380/28–30, 255–283
See application file for complete search history.

(56) References Cited

U.S. PATENT DOCUMENTS

| | | |
|---|---|---|
| 5,226,079 A | 7/1993 | Holloway |
| 5,710,816 A | 1/1998 | Stork et al. |
| 5,790,669 A | 8/1998 | Miller et al. |

(Continued)

FOREIGN PATENT DOCUMENTS

WO    WO-0125883    4/2001

OTHER PUBLICATIONS

David Chaum Blind Signatures for Untraceable Payments, Copyright © 1998, p. 199-203.*

(Continued)

*Primary Examiner* — Evans Desrosiers
(74) *Attorney, Agent, or Firm* — Schwegman, Lundberg & Woessner, P.A.

(57) ABSTRACT

Apparatus, systems, and methods may operate to receive, at a trusted third party (TTP), a signed disguised message as a disguised receiver signature from a receiver that has signed a disguised message using a blind signature process to transform the disguised message into the signed disguised message. Additional activities may include sending, from the TTP, an undisguised version of the disguised message to the receiver, and the receiver signature to a sender of the undisguised version, after determining that the receiver signature is valid. Additional apparatus, systems, and methods are disclosed.

17 Claims, 5 Drawing Sheets

(56) References Cited

U.S. PATENT DOCUMENTS

| | | | |
|---|---|---|---|
| 5,892,900 | A | 4/1999 | Ginter et al. |
| 6,044,463 | A | 3/2000 | Kanda et al. |
| 6,119,179 | A | 9/2000 | Whitridge et al. |
| 6,134,329 | A | 10/2000 | Gao et al. |
| 6,158,003 | A | 12/2000 | Kara |
| 6,336,105 | B1 | 1/2002 | Conklin et al. |
| 6,470,448 | B1 | 10/2002 | Kuroda et al. |
| 6,510,513 | B1 | 1/2003 | Danieli |
| 6,532,543 | B1 | 3/2003 | Smith et al. |
| 6,859,795 | B1 * | 2/2005 | Zolotorev et al. ............... 705/77 |
| 6,904,521 | B1 | 6/2005 | Jivsov |
| 6,963,974 | B1 | 11/2005 | Skinner et al. |
| 7,010,689 | B1 | 3/2006 | Matyas, Jr. et al. |
| 7,142,676 | B1 * | 11/2006 | Hillier et al. .................. 380/278 |
| 7,298,851 | B1 | 11/2007 | Hendricks et al. |
| 7,353,204 | B2 | 4/2008 | Liu |
| 7,434,048 | B1 | 10/2008 | Shapiro et al. |
| 7,840,813 | B2 | 11/2010 | Canard et al. |
| 7,890,757 | B2 | 2/2011 | Sudhakar |
| 8,171,293 | B2 | 5/2012 | Sudhakar |
| 2001/0025311 | A1 | 9/2001 | Arai et al. |
| 2001/0037453 | A1 | 11/2001 | Mitty et al. |
| 2002/0004902 | A1 | 1/2002 | Toh et al. |
| 2002/0143710 | A1 | 10/2002 | Liu |
| 2002/0194470 | A1 | 12/2002 | Grupe |
| 2003/0046533 | A1 | 3/2003 | Olkin et al. |
| 2003/0084003 | A1 | 5/2003 | Pinkas et al. |
| 2003/0126464 | A1 | 7/2003 | McDaniel et al. |
| 2004/0078567 | A1 | 4/2004 | Newbould |
| 2004/0215964 | A1 | 10/2004 | Barlow et al. |
| 2005/0021973 | A1 | 1/2005 | Chen et al. |
| 2005/0039031 | A1 | 2/2005 | Mont et al. |
| 2005/0076210 | A1 | 4/2005 | Thomas et al. |
| 2005/0169479 | A1 | 8/2005 | Ekstrom |
| 2005/0251691 | A1 | 11/2005 | Haufe |
| 2006/0085359 | A1 * | 4/2006 | Kim ................................ 705/65 |
| 2006/0242068 | A1 | 10/2006 | Jogand-Coulomb et al. |
| 2007/0157031 | A1 | 7/2007 | Sudhakar |
| 2007/0160203 | A1 | 7/2007 | Sudhakar |
| 2008/0214300 | A1 | 9/2008 | Williams et al. |
| 2009/0030838 | A1 * | 1/2009 | Jacob et al. ..................... 705/40 |
| 2009/0083372 | A1 * | 3/2009 | Teppler ......................... 709/203 |
| 2009/0319797 | A1 | 12/2009 | Tornqvist |
| 2010/0135497 | A1 | 6/2010 | Sudhakar et al. |
| 2012/0183145 | A1 | 7/2012 | Sudhakar |

OTHER PUBLICATIONS

"U.S. Appl. No. 11/430,539, Notice of Allowance mailed Nov. 15, 2010", 8 pgs.

"U.S. Appl. No. 11/430,454 Non-Final Office Action mailed Jul. 9, 2010", 15 Pgs.

"U.S. Appl. No. 11/430,454, Advisory Action mailed Jun. 17, 2010", 3pgs.

"U.S. Appl. No. 11/430,454, Final Office Action mailed Mar. 26, 2010", 14 pgs.

"U.S. Appl. No. 11/430,454, Non-Final Office Action mailed Oct. 8, 2009", 11 Pgs.

"U.S. Appl. No. 11/430,454, Response filed Jan. 8, 2010 to Non Final Office Action mailed Oct. 8, 2009", 11 pgs.

"U.S. Appl. No. 11/430,454, Response filed Oct. 11, 2010 to Non Final Office Action mailed Jul. 9, 2010", 10 pgs.

"U.S. Appl. No. 11/430,454, Response filed Jun. 4, 2010 to Final Office Action mailed Mar. 26, 2010", 10 pgs.

"U.S. Appl. No. 11/430,539, Advisory Action mailed Aug. 27, 2010", 3.

"U.S. Appl. No. 11/430,539, Final Office Action mailed Jun. 11, 2010", 12 pgs.

"U.S. Appl. No. 11/430,539, Non-Final Office Action mailed Dec. 3, 2009", 13 pgs.

"U.S. Appl. No. 11/430,539, Response filed Mar. 3, 2010 to Non Final Office Action mailed Dec. 3, 2009", 10 pgs.

"U.S. Appl. No. 11/430,539, Response filed Aug. 20, 2010 to Final Office Action mailed Jun. 11, 2010", 8 pgs.

Bo, M, et al., "A fair non-repudiation protocol", Computer Supported Cooperative Work in Design, The 7th International Conference on, (2002), 68-73.

Boudaoud, K., et al., "NRPP : A new solution to prove the receipt of an electronic document", 10th HP Openview University Association Plenary Workshop (HPOVUA), Geneva, Switzerland, http://www.hpovua.org/Publications/Proceedings/10_HPOVUAWS/papers/pdf/HPOVUA03-B8.pdf, (Jul. 2003), 1-3.

Boudaoud, K., "Nrpp: A new solution to prove the receipt of an electronic document", Proc. of the 10th HP Openview University Association Plenary Workshop—HPOVUA'2003, Geneva, Switzerland, (Jul. 6-9, 2003), 1-3.

Tak, S., et al., "A Software Framework for Non-repudiation Service in Electronic Commerce based on the Internet", Eleventh International Conference on Computer Communications and Networks, 2002. Proceedings., http://www.sice.umkc.edu/~leeyu/Publications/cpaper9.pdf, (2002), 182-189.

Tak, Sung Woo, et al., "A Software Framework for Non-Repudiation Service based on Adaptive—Secure Methodology in Electronic Commerce", Information Systems Frontiers, 6(1), (2004), 47-66.

Tak, Sung Woo, et al., "A Software Framework for Non-repudiation Service in Electronic Commerce based on the Internet", Information Systems Frontiers, 6(1), (2004), 47-66.

Bahreman, Alireza, et al., "Certified Electronic Mail", Prec. Symposium on Network and Distrbuted Systems Security Internet Society, (Feb. 1994), 17 pgs.

* cited by examiner

COMMUNICATION WITH NON-REPUDIATION AND BLIND SIGNATURES

This application is a continuation-in-part of U.S. patent application Ser. No. 12/325,425, entitled "COMMUNICATION WITH NON-REPUDIATION," filed on Dec. 1, 2008 (and published as U.S. Patent Publication Number 2010/0135497), which is incorporated herein by reference in its entirety.

RELATED APPLICATIONS

This application may be related to U.S. patent application Ser. No. 11/430,539, entitled "RECEIVER NON-REPUDIATION," filed on May 9, 2006. This application may also be also related to U.S. patent application Ser. No. 11/430,454, entitled "RECEIVER NON-REPUDIATION VIA A SECURE DEVICE," filed on May 9, 2006. These applications, corresponding to U.S. Patent Publication Numbers 2007/0157031 and 2007/0160203 respectively, are assigned to the assignee of the instant application, Novell, Inc. and are also incorporated herein by reference in their entirety.

BACKGROUND

The goal of various non-repudiation schemes is essentially to provide proof that a message has been sent and received. In many cases, a third party (e.g., a central authority or arbitrator) is used to verify time stamps and signatures that serve to document the interaction between a message sender and a message receiver. Sometimes additional parties, such as notaries, are used.

While several mechanisms to support non-repudiation have been developed, most of them load the network down with duplicative data transmission, and/or rely on extensive participation by the third party to the transaction. In addition, the third party may be burdened with storing and maintaining transaction records that will support verification efforts in the future, perhaps to resolve potential disputes.

SUMMARY

In various embodiments, apparatus, systems, and methods that support communication with non-repudiation and blind signatures are provided. For example, in some embodiments, communication with non-repudiation is provided by receiving, at a trusted third party (TTP), a signed disguised message as a disguised receiver signature from a receiver that has signed a disguised message using a blind signature process to transform the disguised message into the signed disguised message. Additional activity may include sending, from the TTP, an undisguised version of the disguised message to the receiver, and the receiver signature to a sender of the undisguised version, after determining that the receiver signature is valid.

In some embodiments, communication with non-repudiation is provided by receiving, at a trusted third party (TTP), a global unique identifier (GUID) and a decryption key from a sender, the decryption key associated with an encrypted message previously sent from the sender to the receiver. Further activities may include receiving, by the TTP, a signed disguised message as a disguised receiver signature from the receiver that has signed a disguised message using a blind signature process to transform the disguised message into the signed disguised message; and sending, from the TTP, the key and the GUID to the receiver, and the receiver signature to the sender, after determining that the receiver signature is valid. Additional embodiments are described, and along with the foregoing examples, will be set forth in detail below.

DETAILED DESCRIPTION

The inventor has discovered a variety of mechanisms that provide communication with non-repudiation, making use of a blind signature process. A TTP is used to verify the receiver signature, as well as to exchange messages, making economical use of network resources. The TTP can discard all information concerning the transaction after the transaction is complete, conserving storage space. A variety of example embodiments will now be described.

As used herein, an "integral communication transaction" is a sequence of communications between a sender of a message and a receiver of the message that satisfies the following three conditions: (1) the sender transmits the message (or some form of the message, such as an encrypted version of the message) to the receiver, either directly, or via a TTP; (2) some form of the message and whatever information is needed for decoding that form of the message (e.g., a key) into its original form is received by the receiver; and (3) proof of the transmission and the reception are generated.

A "receiver" is a party to an integral communication transaction that operates to receive a message, perhaps encrypted, from a sender.

A "sender" is a party to an integral communication transaction that operates to send a message to the receiver. The message that is sent may be encrypted.

A "signature" means an electronic signature, which may comprise a digital electronic signature. Thus, an example of an electronic signature is the transformation of a message using a cryptosystem (e.g., an asymmetric cryptosystem) such that a machine having the initial message and the signer's public key can accurately determine whether the transformation was created using the private key that corresponds to the signer's public key, and whether the initial message has been altered since the transformation was made.

A "trusted third party" or TTP is an entity that facilitates interactions between two parties (e.g., a sender and a receiver) that both trust the third party. The parties that trust the TTP use this trust to secure their own interactions.

Embodiments of the invention can be implemented in a variety of architectural platforms, operating and server systems, devices, systems, nodes, and applications. Any particular architectural layout or implementation presented herein is thus provided for purposes of illustration and comprehension only, and is not intended to limit the various embodiments.

In cryptography, a blind signature comprises a form of signature in which the content of a message is disguised (also called "blinded") before it is signed. The resulting blind signature can be publicly verified against the original, "un-blinded" message in the manner of a regular signature. Blind signatures may be employed in privacy-related protocols where the signer and message author are different parties. Examples include cryptographic election systems and digital cash schemes (e.g., electronic currency).

An analogy to the cryptographic blind signature is the physical act of enclosing a message in a special write-through-capable envelope, which is then sealed and signed by a signing agent. Thus, the signer does not view the message content, but a third party can later verify the signature and know that the signature is valid within the limitations of the underlying signature scheme.

Blind signatures can also be used to provide unlinkability, which prevents the signer from linking the blinded message it signs to a later un-blinded version that it may be called upon to verify. In this case, the signer's response is first "un-blinded" prior to verification in such a way that the signature remains valid for the un-blinded message. This can be useful in schemes where anonymity is required.

Blind signature processes can be implemented using a number of public key signing schemes, such as the Rivest, Shamir and Adleman (RSA) and digital signature algorithm (DSA) schemes. To engage in the blind signature process, a message is first "blinded" or disguised, typically by combining it in some way with a random "blinding factor". The disguised message is passed to a signer, who then signs it using a standard signing algorithm. The resulting message, along with the blinding factor, can be later verified against the signer's public key. In some blind signature schemes, such as RSA, it is even possible to remove the blinding factor from the signature, to provide the signed message in undisguised form, before it is verified. In these circumstances, the final output (i.e., the signature) of the blind signature scheme is identical to that of the normal signing protocol.

In most of the embodiments described herein, there will be three entities: a sender, a receiver and a TTP. Blind signatures are used, so that the message is signed by the signing party without knowing what the actual message is. The receiver can use a key pair for signing that is not used for encryption, to help prevent the occurrence of attacks (when the same key pair is used). Various embodiments are disclosed, some of which will now be described using a communication flow diagram.

Figure 1:
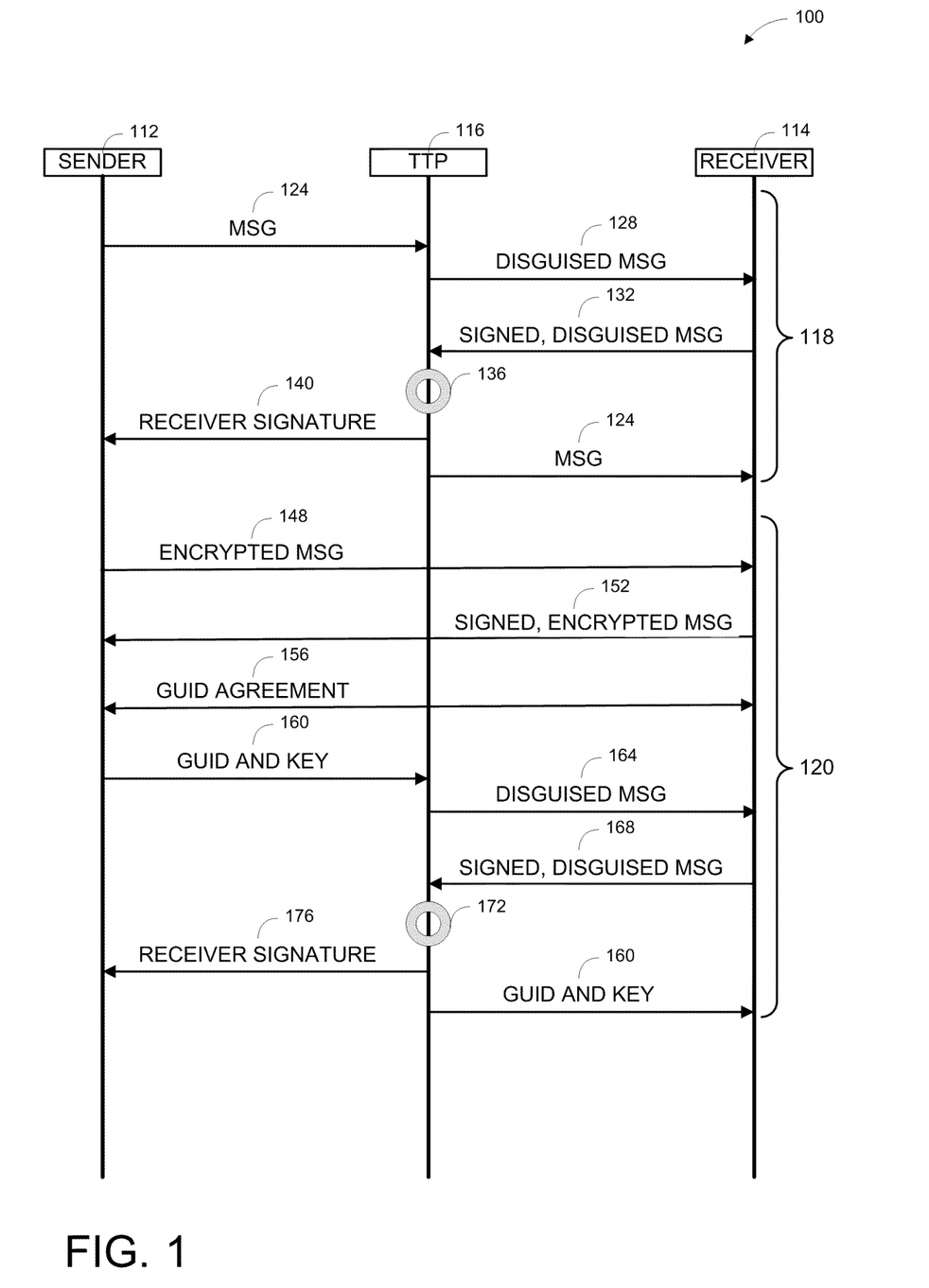
FIG. 1 is a communication flow diagram of two example communication transactions according to various embodiments of the invention.

FIG. 1 is a communication flow diagram of two example communication transactions 118, 120 according to various embodiments of the invention. The diagram illustrates the presence of a sender 112, a receiver 114, and a TTP 116 engaged in the communication transactions 118, 120.

In a first example transaction 118, the sender 112 sends the original message 124 to the TTP 116, and the TTP 116 chooses a number (e.g., a random number) used in the blind signature process to produce a disguised message 128, which is sent to the receiver 114. The receiver 114 then signs the disguised message 128 to provide a signed, disguised message 132. The signed, disguised message 132 is sent to the TTP.

At this time, the TTP 116 removes the disguise from the signed, disguised message 132, leaving the receiver signature 140, which is a signed version of the original, or undisguised version of the message 124. The signature 140 is verified 136 by the TTP 116 to determine its validity. If the signature 140 is determined to be valid by the TTP 116, then the TTP 116 transmits the signature 140 to the sender 112, and the original message 124 to the receiver 114.

The entire transaction 118, or portions of the transaction 118, may be conducted within a secure channel, perhaps using a cryptographic protocol, such as the secure sockets layer (SSL) protocol. Note that there is no need for the TTP 116 to maintain any record of the transaction 118 after the transaction 118 is completed. Thus, after the signature 140 is successfully sent to the sender 112, and the message 124 is sent to the receiver 114, the TTP 116 can discard all data associated with the transaction 118.

In a second example transaction 120, the sender 112 first sends a message to the receiver 114, as an encrypted message 148. This may be accomplished using one or more packets. The receiver 114 signs this encrypted message 148 and transmits the resulting signed, encrypted message 152 back to the sender. Parameters such as the algorithm and identity of the TTP 116 to be used for communication are negotiated as part of an agreement 156 between the sender 112 and receiver 114 that includes a determination of how a globally unique identifier (GUID) will be generated. Since the receiver 114 now possesses all the information it needs to decode the message (except for the decryption key), additional actions are undertaken to prevent the receiver 114 from simply taking the encryption key from the sender 112 without a signature to prove receipt (which would enable repudiation).

Thereafter, the transaction 120 includes the activity of the sender 112 operating to transmit a GUID and the decryption key to the TTP 116. The GUID should be sufficiently large to reduce collisions in the hash that may occur, according to some designated reduction threshold (e.g., less than 0.01% chance of collision), since the encryption key might be relatively small. The GUID can be generated by the sender 112, the receiver 114, or a combination/concatenation of values generated by these individual entities (e.g., individual GUIDs or other information generated by the sender and receiver can be combined to provide a single GUID) can be used.

The TTP 116 chooses a number to be used in the blind signature process (e.g., a random number or encryption key), and uses it to disguise the message received from the sender 112, resulting in a disguised message 164 that is transmitted to the receiver 114. The receiver 114 now signs the disguised message to provide a signed, disguised message 168. The signed, disguised message 168 is sent from the receiver 114 to the TTP 116. The TTP 116 operates to unblind (i.e., remove the disguise from) the signed, disguised message 168 to reveal the receiver signature 176, which is a signed version of the original, undisguised message (not shown in the figure) from the sender 112. The signature 176 is verified 172 by the TTP 116 to determine its validity. If the signature 176 is determined to be valid by the TTP 116, then the TTP 116 transmits the signature 176 to the sender 112, and the GUID and key 160 to the receiver 114.

The entire transaction 120, or portions of the transaction 120, may be conducted within a secure channel, perhaps using a cryptographic protocol, such as the SSL protocol. As was the case with the transaction 118, the TTP 116 does not need to maintain any record of the transaction 120 after the transaction 120 is completed. Thus, after the signature 176 is successfully sent to the sender 112, and the message GUID and key 160 are sent to the receiver 114, the TTP 116 can discard all the data associated with the transaction 120. At this point, the receiver 114 can discard the GUID and use the decryption key to remove encryption from the message data, revealing the original message from the sender.

In some embodiments, the transaction 118 comprises a complete transaction (e.g., when the message 124, or its encrypted version, is relatively small in size). In some embodiments, such as when the encrypted message 148 is large, the transaction 118 can be used to form a portion of the more involved transaction 120.

In such cases, the key (and optionally, the GUID) 160 may take the place of the message 124. The disguised message 164 may take the place of the disguised message 128. The signed, disguised message 168 may take the place of the signed, disguised message 132. Verification 172 may take the place of verification 136. And finally, the receiver signature 176 may take the place of the receiver signature 140. This substitution within the transaction 120 can be useful, for example, when the encrypted message 148 is relatively large. Then only the key (and perhaps the GUID) are sent as the signed, disguised message 164, rather than the entire original message. In these circumstances, handling the key (and optionally the GUID) as part of a mini-message transaction 118, within the overall transaction 120, serves to conserve network bandwidth. Thus, many embodiments may be realized.

Figure 2:
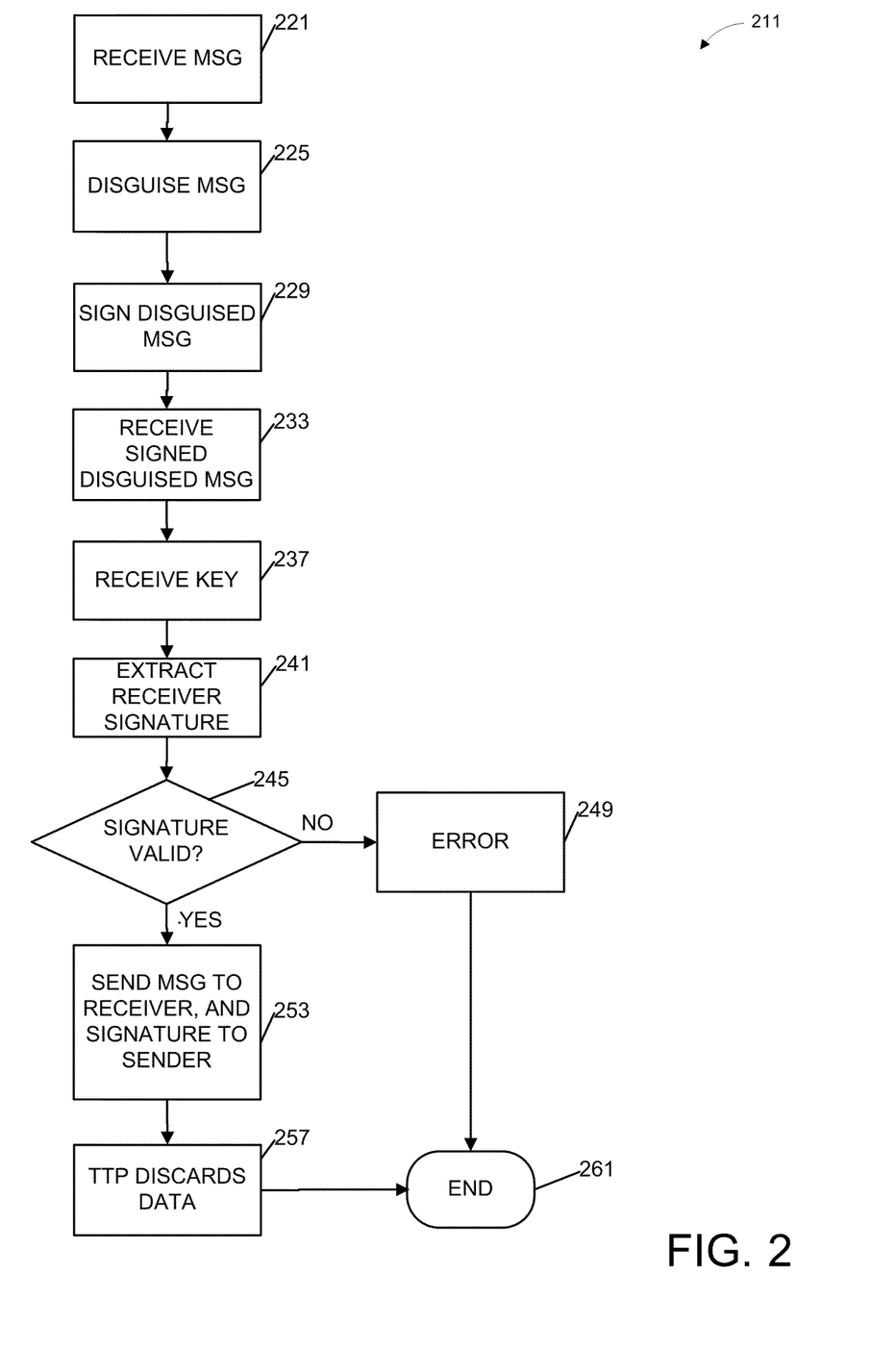
FIG. 2 is an activity flow diagram illustrating methods that operate according to various embodiments of the invention.

For example, FIG. 2 is an activity flow diagram illustrating methods 211 that operate according to various embodiments of the invention. The methods 211 are implemented in a machine-accessible and readable medium, and are operational over processes within and among networks. The networks may be wired, wireless, or a combination of wired and wireless. The methods 211 may be implemented as instructions, which when accessed by a machine, cause the machine to perform the processing depicted and described with respect to FIG. 1.

Thus, in some embodiments, a computer-implemented method 211 of communicating messages with non-repudiation and blind signatures may begin at block 221 with receiving an original message from the sender at the TTP. The TTP can process the original message to generate a disguised message. Thus, the method 211 may continue on to block 225 with processing, by the TTP, the undisguised version received from the sender as an original message, to provide a disguised message. This disguised message can then be transmitted to the receiver.

The method may continue on to block 229 with the receiver signing the disguised message using a blind signature process to transform the disguised message into a signed, disguised message. The method 211 may thus continue on to block 233 with receiving, at the TTP, a signed disguised message. The signed disguised message constitutes a disguised receiver signature. This is received from the receiver that has signed a disguised message using a blind signature process, transforming the disguised message into the signed disguised message.

The receiver's public key may be transmitted to the TTP for safekeeping, prior to engaging in the blind signature process. Thus, the method 211 may continue on to block 237 with receiving a key associated with the receiver signature at the TTP, prior to sending an undisguised version of the disguised message to the receiver, or to sending the disguised receiver signature (comprising a signed version of the message disguised by the TTP) to the sender.

The TTP can remove the disguise from the signed, disguised message (i.e., the disguised receiver signature) to reveal the receiver signature. Thus, the method 211 may continue on to block 241 to include processing the signed, disguised message by the TTP to extract the receiver signature.

Once the receiver signature is extracted and identified by the TTP, it can be verified using the receiver's key that has been sent to the TTP for safekeeping, to determine whether the receiver signature is valid. Thus, the method 211 may go on to block 245 to include verifying, by the TTP, the validity of the receiver signature. If the signature is not valid, then an error may be indicated at block 249, and the method 211 may end at block 261. In some embodiments, the activity of block 257 (described below) occurs, prior to completing the method 211 at block 261.

If the TTP determines that the receiver signature is valid at block 245, then the method 211 may include the activity at block 253, which comprises sending, from the TTP, an undisguised version of the disguised message to the receiver, and sending the receiver signature to the sender of the undisguised version of the message.

After the process is complete, and the message and receiver signature have been delivered to the receiver and sender, respectively, all data held by the TTP can be discarded. Thus, the method 211 may continue on to block 257 to include discarding, by the TTP, some or all data associated with the activities of receiving (e.g., at block 233) and sending (e.g., at block 253), after the sending is complete. Still further embodiments may be realized.

Figure 3:
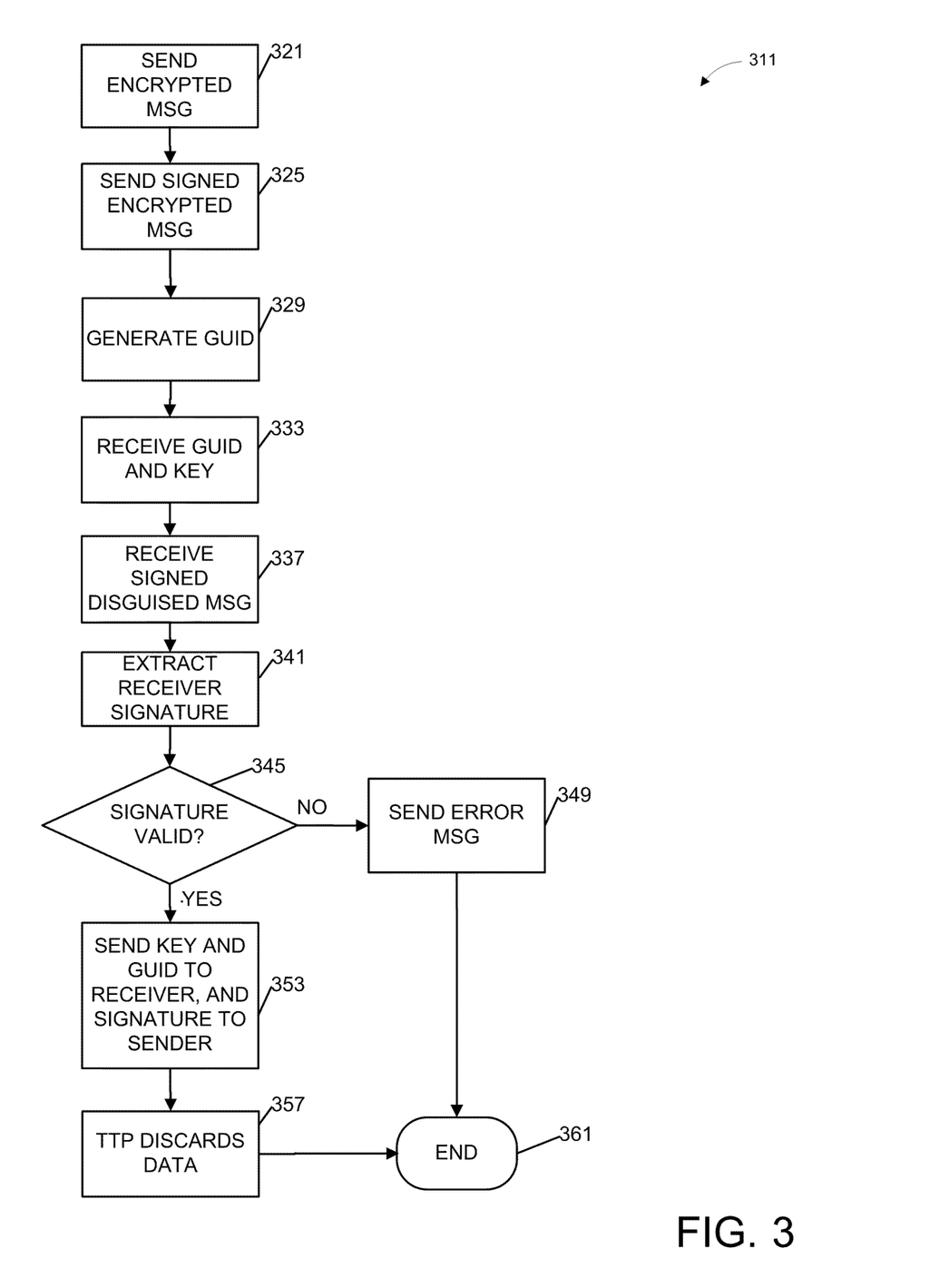
FIG. 3 is an activity flow diagram illustrating additional methods that operate according to various embodiments of the invention.

For example, FIG. 3 is an activity flow diagram illustrating additional methods 311 that operate according to various embodiments of the invention. The methods 311 are implemented in a machine-accessible and readable medium, and are operational over processes within and among networks. The networks may be wired, wireless, or a combination of wired and wireless. The methods 311 may be implemented as instructions, which when accessed by a machine, cause the machine to perform the processing depicted and described with respect to FIG. 1.

In some embodiments, a computer-implemented method 311 of communicating messages with non-repudiation and blind signatures begins at block 321 with sending an encrypted message from a sender to a receiver. The encrypted message may comprise any type of information. Thus the encrypted message may comprise any one or more of an email message or financial information, such as a funds transfer request, an indication of funds received, or an indication of funds transmitted (such as when currency is transmitted or received, a charge is made against a credit card, or as part of the transfer requests that occur in conjunction with banking and other business transactions that may be subject to repudiation).

The encrypted message may also comprise one or more programs, including software program instructions, such as when software programs are downloaded by an end user, a retailer, or a distributor. The encrypted message may also comprise professional advice, such as financial, legal, or medical advice.

In some embodiments, a decryption key and optionally, a GUID will not be sent to the receiver until the complete encrypted message has been sent to the receiver. Thus, the method 311 may also include, at block 321 (prior to sending the key and the optional GUID to the receiver), verifying by the TTP that the encrypted message has been sent from the sender to the receiver.

The method 311 may continue on to block 325 with sending a signed version of the encrypted message from the receiver to the sender. In some embodiments, the decryption key and the optional GUID will not be sent to the receiver until the receiver has signed the encrypted message it has received from the sender, and sent the signed, encrypted message to the sender. Thus, the method 311 may also include, at block 325 (prior to sending the key and the optional GUID to the receiver), verifying by the TTP that the receiver has sent a signed version of the encrypted message to the sender.

The optional GUID can be generated by the receiver, the sender, or some combination (e.g., via concatenation of individual values) of a GUID generated by each of the receiver and the sender. Thus, the method 311 may continue on to block 329 with generating the optional GUID based on data provided by the sender or data provided by the receiver, or a combination of these.

The method 311 may continue on to block 333 to include receiving, by a TTP, a decryption key and optionally, the GUID from the sender. The decryption key may be associated with the encrypted message previously sent from the sender to the receiver.

The method 311 may continue on to block 337 with receiving, by the TTP, a signed, disguised message as a disguised receiver signature from the receiver that has signed a disguised message using a blind signature process to transform the disguised message into the signed, disguised message. An encryption key may be used by the receiver to sign the disguised message.

The method 311 may continue on to block 341 with extracting the receiver signature from the signed, disguised message, as described with respect to FIG. 2 (see block 241 in FIG. 2).

Once the receiver signature is extracted and identified by the TTP, it can be verified using the receiver's key that has been sent to the TTP for safekeeping, to determine whether the receiver signature is valid. Thus, the method 311 may go on to block 345 to include verifying, by the TTP, the validity of the receiver signature. If the signature is not valid, then the method 311 may continue on to block 349, where an error is indicated. For example the activity at block 349 may comprise sending an error message to at least one of the sender or the receiver if the receiver signature is determined to be invalid. The method 311 may then include the activity at block 357, where the TTP discards all data included in the transaction (e.g., as described with respect to block 257 in FIG. 2), or simply go on to end at block 361.

If the TTP determines that the receiver signature is valid at block 345, then the method 311 may include the activity at block 353, which comprises sending, from the TTP, the decryption key and the GUID to the receiver, and the receiver signature to the sender. The key used to decrypt the encrypted message by the receiver can be a symmetric key, or an asymmetric key.

The method 311 may continue on from block 353 to block 357, to include having the TTP discard any or all information associated with the transaction described by FIG. 3. The method 311 may then end at block 361.

Any or all of the information communicated between the sender, the receiver, and the TTP can be sent over a secure data channel, such as a communications channel associated with the SSL protocol. Thus, in some embodiments, the method 311 may comprise sending at least one of the encrypted message, the disguised message, the key, or the GUID via a secure data channel.

In any instance where a decryption key is mentioned herein, it should be noted that the decryption key may form one part of an encryption key—decryption key asymmetric pair. In some embodiments, however, the decryption key comprises a symmetric key. Thus, the encryption/decryption process can be symmetric or asymmetric, as desired.

The methods described herein do not have to be executed in the order described, or in any particular order, unless so specified. Moreover, various activities described with respect to the methods identified herein can be executed in repetitive, looped, serial, or parallel fashion. The individual activities shown in FIG. 1, and the methods shown in FIGS. 2 and 3 can also be combined with each other and/or substituted, one for another, in various ways. For example, as noted with respect to the activity in FIG. 1, the operations of FIG. 2 may be adapted to convey a key and optional GUID, within the more extended operations of FIG. 3. Information, including parameters, commands, operands, and other data, can be sent and received in the form of one or more carrier waves.

Figure 4:
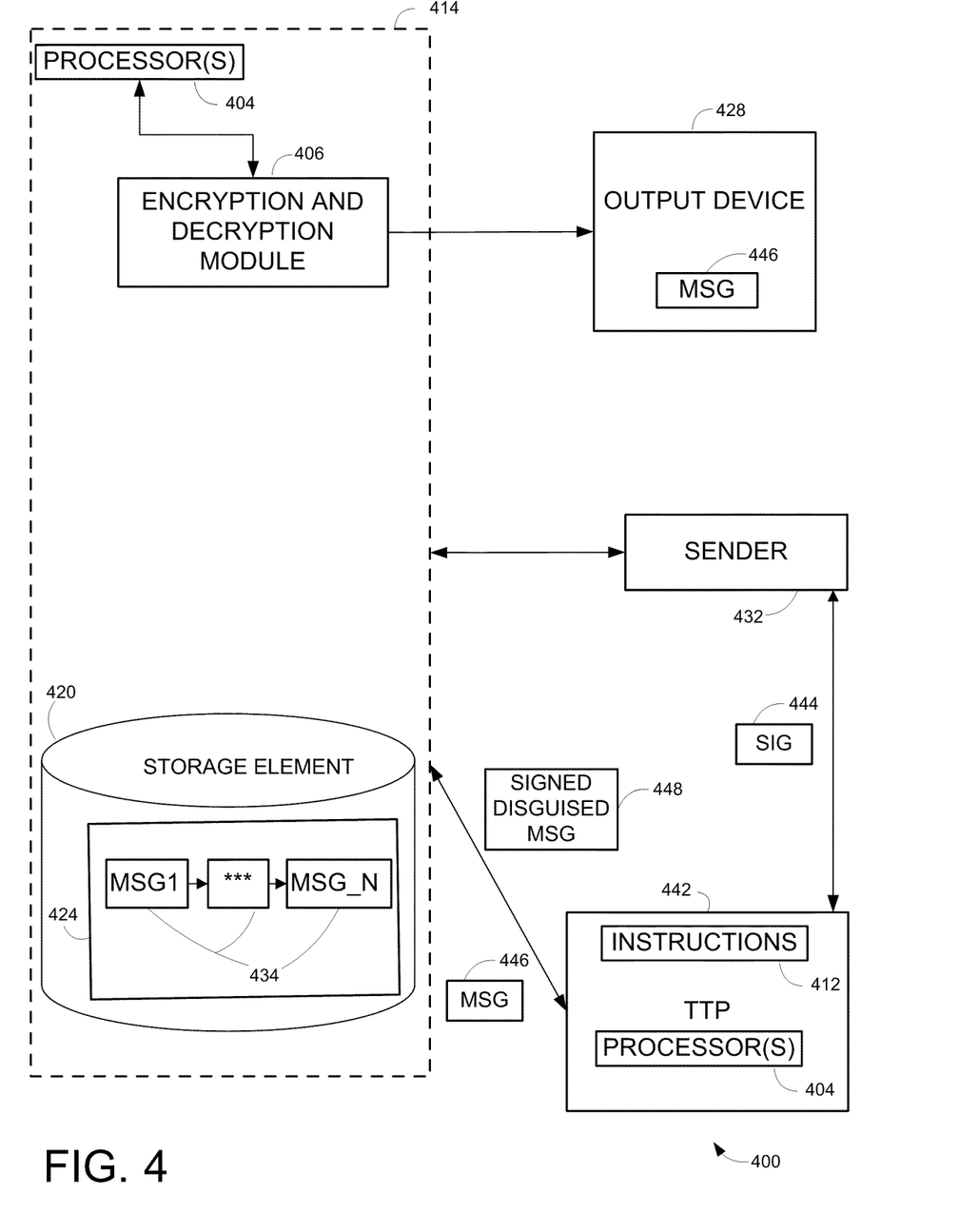
FIG. 4 is a block diagram of apparatus and systems that can communicate according to various embodiments of the invention.

FIG. 4 is a block diagram of apparatus 442 and systems 400 that can communicate according to various embodiments of the invention. The apparatus 442 and system 400 may be implemented in a machine-accessible and readable medium and is operational over one or more networks. The networks may be wired, wireless, or a combination of wired and wireless. The apparatus 442 and system 400 implement, among other things, the processing associated with the communication activity of FIG. 1, and the methods 211 and 311 of FIGS. 2 and 3, respectively.

The system 400 may include a number of modules such as one or more processors 404 and an encryption/decryption module 406. The encryption/decryption module 406 may be integrated, as shown, or divided into separate encryption and decryption modules.

These modules may be associated within a single apparatus 442, such as a personal digital assistant (PDA), laptop computer, personal computer, workstation, client, server, or any other machine, as indicated by their containment within the dashed box. Additional apparatus 414, 432 may operate as a receiver and sender, respectively. Any of the components in the apparatus 414, 432, 442 may be used in any other one of the apparatus, included in single or multiple quantities.

A storage element 420, such as a database, a memory, a disk, or other storage device, may be accessed by any of the apparatus shown (including those operating as a receiver 414, a sender 432, and/or a TTP 442). The storage element 420 may serve to contain one or more items having electronic content 424, such as messages (or encrypted messages) and other information 434, including encryption and decryption keys, used to encode messages, and decode encrypted messages back into their original form, respectively. The messages and other information 434 may be transferred to other devices, such as apparatus 414 (operating as a receiver), apparatus 432 (operating as a sender), and/or apparatus 442, which can operate as a TTP. The apparatus 414, 432, and/or 442 may comprise clients and/or servers. The storage element 420 may be included in a remote server.

The encryption/decryption module 406 may be operably coupled to an output device 428, such as a server, client device, display device (e.g., monitor, projector, video card, etc.), printer, or loudspeaker, among others. The output device 428 may be used for presenting renderings of the output generated by or derived from the messages and other information 434. Rendering may take the form of displaying screen images. Thus, many embodiments may be realized.

For example, an apparatus 442 operating as a TTP may comprise one or more processors 404 and a memory (e.g., the storage element 420) to store a signed disguised message 448, along with instructions 412. The instructions 412, when executed by the processors 404, may result in the processors 404 operating to receive, as a TTP, the signed disguised message 448 as a disguised receiver signature from a receiver (e.g., apparatus 414) that has signed a disguised message using a blind signature process, as described previously.

The processors 404 in the receiver may operate, to transform the disguised message into the signed disguised message 448. The apparatus 442, operating as a TTP, may operate, by executing the instructions 412, to send an undisguised version 446 of the disguised message to the receiver, and the receiver signature 444 to the apparatus 432, operating as a sender, after determining that the receiver signature is valid.

The system 400 may include a server to house the sender. Thus, in some embodiments, the system 400 may include a server to house the apparatus 432, operating as a sender, and a display device (e.g., the output device 428) to display, in human-perceptible format, an original message 446 prior to being encrypted to form the encrypted message.

The system 400 may include a server to house the receiver. Thus, in some embodiments, the system 400 may include a server to house the apparatus 414, operating as a receiver and a display device (e.g., output device 428) to display, in human-perceptible format, a decrypted form of the encrypted message.

In some embodiments, a system 400 includes one or more each of the apparatus 414, 432, and/or 442. The system 400 may thus comprise an encryption module, for example, to transform an original message 446 into the disguised message. Still further embodiments may be realized.

Figure 5:
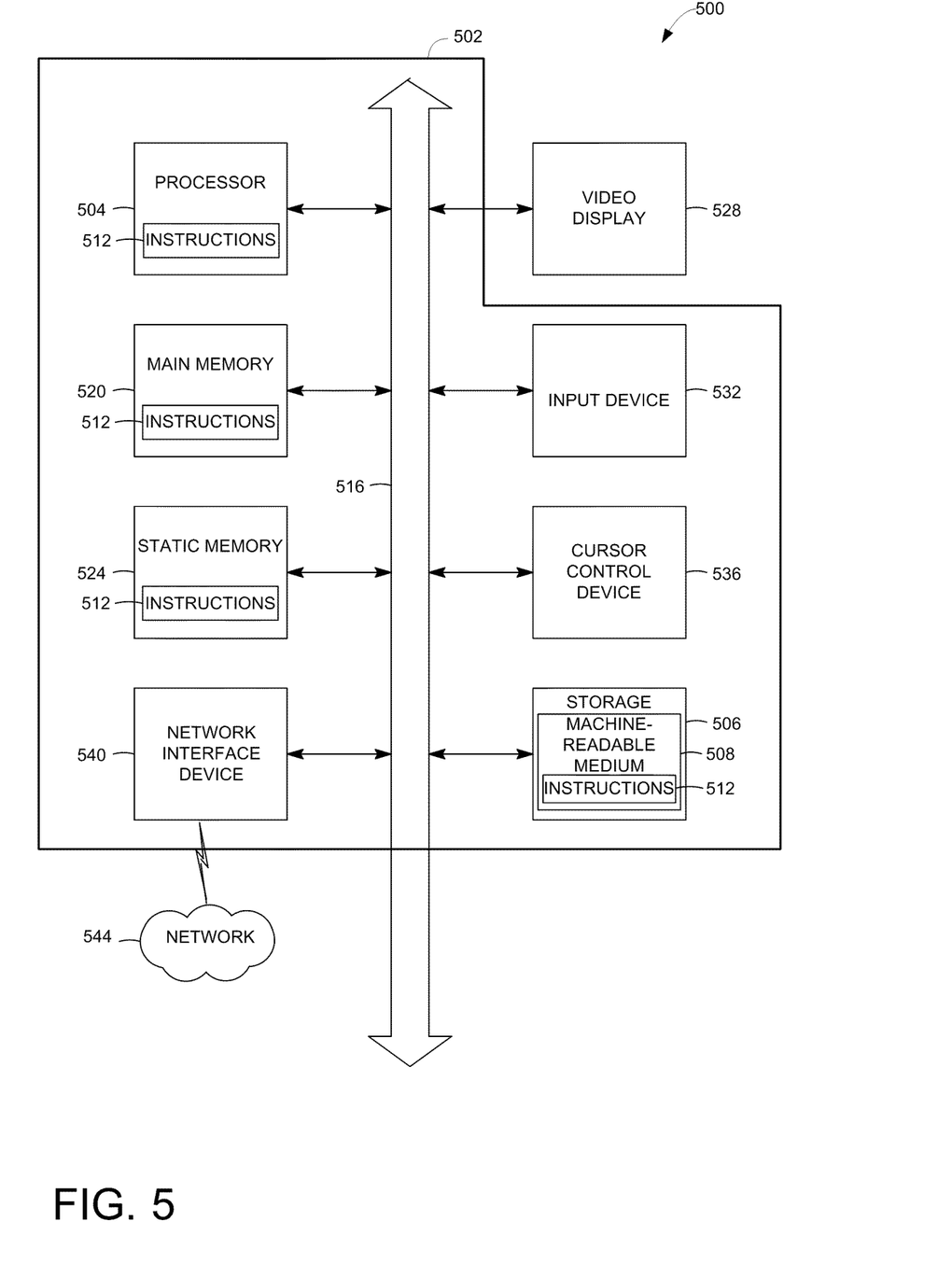
FIG. 5 is a block diagram of an article of manufacture, including a machine, according to various embodiments of the invention.

For example, FIG. 5 is a block diagram of an article 500 of manufacture, including a machine 502, according to various embodiments of the invention. Upon reading and comprehending the content of this disclosure, one of ordinary skill in the art will understand the manner in which a software program can be launched from a computer-readable medium in a computer-based system to execute the functions defined in the software program.

One of ordinary skill in the art will further understand the various programming languages that may be employed to create one or more software programs designed to implement and perform the methods disclosed herein. The programs may be structured in an object-orientated format using an object-oriented language such as Java or C#. Alternatively, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

For example, an article 500 of manufacture, such as a computer, a memory system, a magnetic or optical disk, some other storage device, and/or any type of electronic device or system may include one or more processors 504 coupled to a machine-readable medium 508 such as a memory (e.g., removable storage media, as well as any memory including an electrical, optical, or electromagnetic conductor) having instructions 512 stored thereon (e.g., computer program instructions), which when executed by the one or more processors 504 result in the machine 502 performing any of the actions described with respect to the illustrated methods.

The machine 502 may take the form of a computer system having a processor 504 coupled to a number of components directly, and/or using a bus 516. Thus, the machine 502 may be similar to or identical to the apparatus 414, 432, 442, or the system 400 shown in FIG. 4.

Turning now to FIG. 5, it can be seen that the components of the machine 502 may include main memory 520, static or non-volatile memory 524, and mass storage 506. Other components coupled to the processor 504 may include an input device 532, such as a keyboard, a cursor control device 536, such as a mouse. An output device 528, such as a video display, may be located apart from the machine 502 (as shown), or made as an integral part of the machine 502.

A network interface device 540 to couple the processor 504 and other components to a network 544 may also be coupled to the bus 516. The instructions 512 may be transmitted or received over the network 544 via the network interface device 540 utilizing any one of a number of well-known transfer protocols (e.g., HyperText Transfer Protocol). Any of these elements coupled to the bus 516 may be absent, present singly, or present in plural numbers, depending on the specific embodiment to be realized.

The processor 504, the memories 520, 524, and the storage device 506 may each include instructions 512 which, when executed, cause the machine 502 to perform any one or more of the methods described herein. In some embodiments, the machine 502 operates as a standalone device or may be connected (e.g., networked) to other machines. In a networked environment, the machine 502 may operate in the capacity of a server or a client machine in server-client network environment, or as a peer machine in a peer-to-peer (or distributed) network environment.

The machine 502 may comprise a personal computer (PC), a tablet PC, a set-top box (STB), a PDA, a cellular telephone, a web appliance, a network router, switch or bridge, server, client, or any machine capable of executing a set of instructions (sequential or otherwise) that specify actions to be taken by that machine. Further, while only a single machine 502 is illustrated, the term "machine" shall also be taken to include any collection of machines that individually or jointly execute a set (or multiple sets) of instructions to perform any one or more of the methodologies discussed herein, including those illustrated in FIGS. 1, 2, and 3.

While the machine-readable medium 508 is shown as a single medium, the term "machine-readable medium" should be taken to include a single medium or multiple media (e.g., a centralized or distributed database, and/or associated caches and servers, and or a variety of storage media, such as the registers of the processor 504, memories 520, 524, and the storage device 506 that store the one or more sets of instructions 512. The term "machine-readable medium" shall also be taken to include any medium that is capable of storing, encoding or carrying a set of instructions for execution by the machine and that cause the machine 502 to perform any one or more of the methodologies of the present invention, or that is capable of storing, encoding or carrying data structures utilized by or associated with such a set of instructions. The terms "machine-readable medium" or "computer-readable medium" shall accordingly be taken to include tangible media, such as solid-state memories and optical and magnetic media.

Implementing the apparatus, systems, and methods of the various embodiments may thus provide additional flexibility with respect to communications activity. For example, storage space used by TTP entities may be reduced, since records that serve to prove up the occurrence of transactions between senders and receivers can be discarded after each integral communication transaction is completed. Network loading may be reduced. Increased user satisfaction may result.

Various embodiments may be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Certain applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). Modules may include hardware circuitry, optical components, single or multi-processor circuits, memory circuits, software program modules and objects, firmware, and combinations thereof, as appropriate for particular implementations of various embodiments. The term "module" includes an identifiable portion of code, data, or a computational object to achieve a particular function, operation, processing, or procedure.

Some embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of ordinary skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving, at a trusted third party (TTP), a signed disguised message as a disguised receiver signature from a receiver that has signed a disguised message using a blind signature process to transform the disguised message into the signed disguised message; sending, from the TTP, an undisguised version of the disguised message to the receiver, the undisguised version sent to the TTP by a sender of the undisguised version, and sending, from the TTP, a receiver signature associated with the disguised receiver signature to the sender of the undisguised version, after determining that the receiver signature is valid;
   prior to sending a decryption key associated with an encrypted message previously sent from the sender to the receiver, performing at least one of verifying by the TTP that the encrypted message has been sent from the sender to the receiver or verifying by the TTP that the receiver has sent a signed version of the encrypted message to the sender; and
   discarding, by the TTP, all data associated with the receiving and the sending, after the sending is complete.

2. The method of claim 1, further comprising:
   processing, by the TTP, the undisguised version received from the sender as an original message to provide the disguised message.

3. The method of claim 1, further comprising:
   receiving a key associated with the receiver signature at the TTP, prior to the sending.

4. The method of claim 1, further comprising:
   processing the signed disguised message by the TTP to extract the receiver signature.

5. The method of claim 1, wherein the determining comprises:
   verifying, by the TTP, validity of the receiver signature.

6. A method, comprising:
   receiving, by a trusted third party (TTP), a decryption key and an optional global unique identifier (GUID) from a sender, the decryption key associated with an encrypted message previously sent from the sender to the receiver;
   receiving, by the TTP, a signed disguised message as a disguised receiver signature from the receiver that has signed a disguised message using a blind signature process to transform the disguised message into the signed disguised message;
   sending, from the TTP, the key and the optional GUID to the receiver, and a receiver signature associated with the disguised receiver signature to the sender, after determining that the receiver signature is valid;
   prior to sending the key and the optional GUID to the receiver, performing at least one of verifying by the TTP that the encrypted message has been sent from the sender to the receiver or verifying by the TTP that the receiver has sent a signed version of the encrypted message to the sender; and
   discarding, by the TTP, all data associated with the receiving and the sending, after the sending is complete.

7. The method of claim 6, further comprising:
   generating the optional GUID based on data provided by the sender or data provided by the receiver, or a combination of these.

8. The method of claim 6, wherein the decryption key comprises an asymmetric key.

9. The method of claim 6, wherein sending the key and the optional GUID further comprise:
   sending at least one of the encrypted message, the disguised message, the key, or the optional GUID via a secure data channel.

10. The method of claim 6, wherein the encrypted message comprises an email message.

11. The method of claim 6, wherein the encrypted message comprises at least one of a funds transfer request, an indication of funds received, or an indication of funds transmitted.

12. The method of claim 6, wherein the encrypted message comprises software program instructions.

13. The method of claim 6, further comprising:
   sending an error message to at least one of the sender or the receiver if the receiver signature is determined to be invalid.

14. A system, comprising:
   one or more processors; and
   a memory to store a signed disguised message and instructions which, when executed by the one or more processors, results in the one or more processors operating to receive, as a trusted third party (TTP), the signed disguised message as a disguised receiver signature from a receiver that has signed a disguised message using a blind signature process to transform the disguised message into the signed disguised message, and to send, as a TTP, an undisguised version of the disguised message to the receiver, the undisguised version sent to the TTP by a sender of the undisguised version, to send as the TTP, a receiver signature associated with the disguised receiver signature to a sender of the undisguised version, after determining that the receiver signature is valid, and prior to sending a decryption key associated with an encrypted message previously sent from the sender to the receiver, perform at least one of verifying by the TTP that the encrypted message has been sent from the sender to the receiver or verifying by the TTP that the receiver has sent a signed version of the encrypted message to the sender, and discard, by the TTP, all data associated with the receiving and the sending, after the sending is complete.

15. The system of claim 14, further comprising:
a server to house the sender; and
a display device to display, in human-perceptible format, an original message prior to being encrypted to form the encrypted message.

16. The system of claim 14, further comprising:
a server to house the receiver; and
a display device to display, in human-perceptible format, a decrypted form of the encrypted message.

17. The system of claim 14, further comprising:
an encryption module to transform an original message into the disguised message.

\* \* \* \* \*